Patented Oct. 10, 1944

2,360,306

UNITED STATES PATENT OFFICE 2,360,306

PLASTIC POLYVINYL ACETAL COMPOSITIONS

Howard K. Nason, St. Louis, Mo., assignor to Monsanto Chemical Company, St. Louis, Mo., a corporation of Delaware No Drawing. Application June 29, 1939,
Serial No. 281,817

8 Claims. (Cl. 260—36)

The present invention relates to polyvinyl acetal resins and to softening and plasticizing substances therefor. This invention is directed particularly to polyvinyl acetal resinous compositions plasticized with alkyl diphenyls in conjunction with other plasticizers and more particularly in conjunction with phthalate esters.

It is an object of the present invention to provide a plasticizer composition for polyvinyl acetal resins which imparts to plastic compositions embodying such resins certain especially desirable characteristics such as stability to light and heat, flexibility without softness or tackiness. Further objects and advantages of my invention will be apparent from the description hereinafter.

In United States Patent No. 2,115,524, granted to Carroll A. Hochwalt and Nicholas N. T. Samaras, there is disclosed the use of various alkyl diphenyls as plasticizers for vinyl resins, acrylic acid resins, styrene resins and the like, and particularly for thermosetting phenol-aldehyde resins when used in small proportions. This present application is directed to compositions embodying polyvinyl acetal resins in admixture with plasticizing compositions containing mixtures of two or more plasticizers, one of which is an alkylated diphenyl or a mixture of alkylated diphenyls of the same or differing degrees of alkylation. The other plasticizer component of the mixture may be an alkyl phthalate ester, such as dibutyl phthalate or any plasticizer which is compatible with alkylated diphenyls and the particular polyvinyl acetal resin employed. By virtue of these plasticizing compositions polyvinyl acetal resinous compositions having certain unexpectedly enhanced characteristics have been obtained, which compositions are particularly suitable for use as interlayers in laminated or safety glass, as is pointed out more completely hereinafter.

Polyvinyl acetal resins are generally designated as resins resulting from condensation of an aldehyde such as for example formaldehyde, acetaldehyde, propionaldehyde or butyraldehyde with a polyvinyl alcohol or partially esterified polyvinyl alcohol. In general, they are produced by partial or complete hydrolysis of a vinyl ester polymer such as polyvinyl acetate and subsequent condensation of such hydrolyzed polymer with an aldehyde. Such resins are described, for example, in United States Patent No. 2,036,092, dated March 31, 1936. Commercial polyvinyl acetal resins are known to the industry under such trade names as "Formvar," "Alvar," and "Butvar." These resins are especially difficult to plasticize with any outstanding degree of success by means of the plasticizers commonly used for cellulose esters and ethers such as dibutyl phthalate, camphor, tricresyl phosphate and the like. Inasmuch as these polyvinyl acetal resins are of outstanding toughness and are especially desirable as safety glass interlayers, extensive investigations have been in progress to discover plasticizers which would overcome the inherent brittleness of the resins and provide plastic compositions which could be used for such purposes.

Many plasticizers after incorporation with polyvinyl acetal resins and formation of a film from the resulting composition, provide films of the requisite degree of flexibility but such films are tacky and soft, lacking firmness or hardness, and cannot be manipulated easily in sheet form. Other plasticizers cannot be incorporated in sufficient proportions, that is, they are not retained by the composition in sufficient proportion to have any substantial effect on the flexibility of the resulting film. Dibutyl phthalate is an example of a plasticizer which when present in any substantial proportions in polyvinyl acetal films imparts tackiness and softness to the films when present in sufficient proportion to have a substantial effect on flexibility. The use of many other plasticizers is precluded because of their instability to light and heat, their volatility and their high cost.

It has now been discovered that mixtures of alkylated diphenyls and other plasticizers such for example as alkyl phthalate ester plasticizers can be used as plasticizers for polyvinyl acetal resins, and that the films formed from such compositions are remarkably resistant to discoloration by light and heat and are clear, transparent, colorless and of excellent appearance, and are free from the tackiness exhibited by polyvinyl acetal resin films having the same degree of flexibility that are plasticized with dibutyl phthalate. The polyvinyl acetal resin films plastized with a mixture of dibutyl phthalate and an ethylated diphenyl are especially flexible at low temperatures, which is an important characteristic when their use as interlayers for safety glass is contemplated, and this flexibility is achieved without any appreciable degree of tackiness being imparted to the film. The mixtures of alkylated diphenyls with other plasticizers, contrary to expectations, impart characteristics to polyvinyl acetal resin films which were not predictable from the respective actions of the individual plasticizers in such films. One component of the plasticizer mixture not only complements the action of the other component but imparts, to the resulting composition, characteristics not possessed to any substantial degree by either component.

"Alkylated diphenyls" as the term is used hereinafter, is to be understood to designate single substantially pure alkyl diphenyls such as ethyl diphenyl, propyl diphenyl, butyl diphenyl, amyl diphenyl, hexyl diphenyl and higher homologues, as well as the various isomers thereof and mixtures of such isomers and the corresponding dialkyl and polyalkyl diphenyls and mixtures thereof, and mixtures of alkylated diphenyls of the same or varying degrees of alkylation. The alkyl diphenyls may be normaly liquid or solid crystalline or waxy bodies. Certain pure alkyl diphenyls have been heretofore prepared by various methods including certain indirect methods of synthesis. Especialy useful for the purposes of this invention are the normaly liquid products obtained by direct alyklation of diphenyl with olefins such as ethylene, propylene, butylene, amylene or the corresponding alkyl halides or the corresponding alcohols.

By the term "alkyl phthalate esters" as used herein are designated the neutral alkyl esters of phthalic acid such as dimethyl phthalate, diethyl phthalate, dipropyl phthalate, diisopropyl phthalate, normal-dibutyl phthalate and the various isomeric dibutyl phthalates, as well as higher homologues and more complex alkyl esters such as glycol phthalates which may be obtained by esterification of phthalic acid with the corresponding monohydric alcohols or polyhydric glycols, or glycol ethers and esters, or by reaction of a phthalic acid salt with the corresponding alkyl chloride.

Typical compositions of my invention are illustrated in the examples which follow and the advantages and characteristics of such compositions are described both in the examples and are manifest in the results of tests hereinafter set forth.

*Example 1.*—To 100 grams of a commercial "Butvar" resin, the condensation product of butyraldehyde and a partialy hydrolyzed polymer of vinyl acetate, comprising 16 to 20 hydroxyl calculated as polyvinyl alcohol, 2% or less of aectate and the balance acetal, were added 35 grams of a fraction of ethylated diphenyl having a boiling range of 105 to 127° C. at 3 mm. pressure and 25 grams of di-n-butyl phthalate. The mixture was heated in a glass beaker at 110° C. and subsequently pressed into films of a thickness of about 0.03 inch. The resulting film was clear, transparent, colorless and showed very little discoloration when subjected to heating in an oven at 105° C. for 120 hours. The film was not tacky and had a desirable firmness or hardness acompanied by good flexibility.

The ethylated diphenyl fraction was prepared by passing ethylene slowly into ·diphenyl containing approximately 3 to 5% anhydrous aluminum chloride (based on the weight of diphenyl) until approximately 3 molecular proportions of ethylene to 1 molecular proportion of diphenyl had been absorbed. The catalyst layer was separated and the product was fractionated under vacuum. Two fractions were collected, one having a boiling range from 105° to 127° C. at 3 mm. pressure, which was used in this example, and the other having a boiling range from 127° to 167° C. at 3 mm. pressure, which was used in example 2, hereinafter shown. Both these fractions of ethylated diphenyl were liquid at room temperature.

*Example 2.*—To 100 grams of the "Butvar" resin used in Example 1 were added 35 parts of a liquid fraction of ethylated diphenyl having a boiling range of 127° to 167° C. at a pressure of 3 mm. of mercury whose preparation was described in Example 1 and 25 parts of di-n-butyl phthalate. The mixture was warmed to 110° to incorporate the ingredients and then formed into a sheet of approximately the same thickness as the film of Example 1.

The resulting film was characterized by the same exceptional properties to substantially the same degree as those of the film of Example 1.

*Example 3.*—A film was prepared by the method described in Examples 1 and 2, using a composition consisting of 100 parts by weight of "Butvar" resin, 25 parts by weight of di-n-butyl phthalate and 35 parts by weight of a liquid ethylated diphenyl .fraction having a boiling range of 105° to 167° C. at a pressure of 3 mm. of mercury prepared by the general method described in Example 1 and corresponding to a composite fraction of the two fractions separated in Example 1.

This film was similar to those of Examples 1 and 2 but was somewhat more resistant to discoloration by heat, the color being substantially unaffected by exposure at 105 C. for 120 hours.

*Example 4.*—A film was prepared by the method described in Example 1, using a composition consisting of 100 parts by weight of "Butvar" resin, 25 parts by weight of di-n-butyl phthalate and 35 parts by weight of a liquid butylated diphenyl consisting of a fraction having a boiling range from 121° to 210 C. at a pressure of 3 mm. obtained by passing butylene into molten diphenyl in the presence of 3 to 5 per cent of anhydrous aluminum chloride (based on the weight of diphenyl) until approximately 0.84 molecular proportion of butylene had been absorbed per molecular proportion of diphenyl. The butylated diphenyl was a liquid at room temperature.

This film was slightly less resistant to discoloration by heat than any of those of Examples 1, 2 and 3, but its resistance was good. The slight darkening observed after exposure for 24 hours at 105° C. was not substantial.

*Example 5.*—A film was prepared by the method described in Example 1, using a composition consisting of 100 parts of "Butvar" resin, 25 parts of di-n-butyl phthalate and 35 parts of a liquid propylated diphenyl having a boiling range of 122° to 175° C. at a pressure of 3 mm.

The propylated diphenyl fraction was obtained by reaction of molten diphenyl containing 3 to 5 per cent. of its weight of anhydrous aluminum chloride with propylene until approximately 3 molecular proportions of propylene had been absorbed for each molecular proportion of diphenyl. The aluminum chloride was separated as in Example 1 and the propylated diphenyl was distilled under vacuum. This propylated diphenyl fraction had an average molecular weight of 266; the theoretical molecular weight for a tri-isopropyl diphenyl is 280. The fraction was a liquid at room temperature.

The resulting film was similar to that of Example 1, and its color remained substantially unaffected by an exposure to 105° C. in an oven for 120 hours,

*Example 6.*—A film was prepared as in Example 5 by substituting a fraction of the propylated diphenyl having a boiling range of 126° to 145° C. at 3 mm. for the fraction of wider boiling range used in Example 5.

In all respects this film was substantially identical with that of Example 5. Its resistance to discoloration by heat was similar to that made in the foregoing examples with ethylated diphenyl fractions and very slightly less stable to discoloration after 120 hours at 105° C. than the film of Example 5.

*Comparison film.*—For comparison tests, a film was prepared by incorporating 60 parts of di-n-butyl phthalate with 100 parts of "Butvar" resin. The film was tacky, had satisfactory flexibility, but was not firm or hard and could not be easily handled in sheet form. The film discolored after 48 hours exposure to a temperature of 70° C. Its color darkened appreciably after several hours exposure at 105° C.

Flexibility tests

The films prepared hereinabove, all having a thickness of from 0.02 to 0.03 inch, were subjected to bending or folding at a temperature of −22° F. (−30° C.) and were repeatedly bent through an angle of 180° C. until a break became apparent. The number of bends for the first break to become apparent and the number of bends required to produce a final breaking or dividing of the film at the bending axis were as follows. Each bend consisted of a bend through 180° C. and back to the original position.

| Film | Thickness, inches | Bends for first break | Bends for final break |
|---|---|---|---|
| Comparison | 0.027 | 160 | 280 |
| From Example 1 | 0.0335 | 120 | 200 |
| From Example 2 | 0.0310 | 54 | 88 |
| From Example 3 | 0.0275 | 81 | 101 |
| From Example 4 | 0.0267 | 88 | 108 |
| From Example 5 | 0.032 | 14 | 50 |
| From Example 6 | 0.029 | 78 | 116 |

The foregoing examples consist of preferred embodiments of the invention and were chosen to show comparable results. Similar results are obtained with other polyvinyl acetal resin films plasticized with alkylated diphenyls in admixture with other well-known plasticizers. The alkylated diphenyls have a heat and light stabilizing effect on compositions containing polyvinyl acetal resins and other plasticizers and their addition to such compositions reduces the tackiness, lack of firmness and softness of films containing other plasticizers without substantial effect on the flexibility of the film.

Typical polyvinyl acetal resins for which the alkylated diphenyl plasticizers of the present invention are suitable have been specified hereinbefore. Other plasticizers with which the alkylated diphenyls are contemplated for use include in general, alkyl phthalate esters, alkyl and aryl phosphate esters such as tributyl phosphate, triphenyl phosphate and tricresyl phosphate, fatty acid esters of mono and polyhydric alcohols as for example butyl laurate, diethylene glycol dibutyrate, triethylene glycol dihexoate, esters of dibasic acids as for example dimethyl sebacate, diethyl adipate, esters of diglycollic and thiodiglycollic acid, and other plasticizers miscible and compatible with polyvinyl acetal resins and alkylated diphenyls.

The proportions of the mixed plasticizers which are to be used will be dependent to a great extent upon the flexibility desired in the resulting film, and upon the solubility characteristic of the particular acetal resin employed. In my examples I have shown the most desirable ranges of the particular mixed plasticizers for use in the production of films from "Butvar" resin for use as safety glass interlayers. These optimum proportions are approximately 35 to 40 parts of ethylated or similar alkylated diphenyl, 20 to 25 parts of dibutyl phthalate and 100 parts of "Butvar." With other polyvinyl acetal resins a slightly different ratio of the components might be preferred. Thus, in the case of "Formvar" comprising substantially 82 percent acetal, 8% hydroxyl groups calculated as polyvinyl alcohol and 10% acetate, a reduced amount of alkylated diphenyl is employed and diethyl phthalate is preferably substituted for dibutyl phthalate.

Other components may be added to the plastic compositions of this invention in the usual manner to provide different effects, for example, stabilizers for the resin such as amines, coloring ingredients, filling ingredients, opacifying agents, and the like.

Inasmuch as the foregoing description comprises preferred embodiments, it is to be understood that my invention is not limited thereto and that variations and modifications may be made in known manner without departing substantially from the invention which is defined in the appended claims.

What I claim is:

1. A plastic composition of matter characterized by substantial lack of tackiness and possessing resistance to the action of light and heat consisting essentially of a polyvinyl acetal resin and comprising an alkylated diphenyl as one component of a mixed plasticizer, the other component of which normally imparts tackiness to the polyvinyl acetal resin.

2. A plastic composition of matter characterized by substantial lack of tackiness and possessing resistance to the action of light and heat and being flexible at low temperatures in film form consisting essentially of a polyvinyl acetal resin and comprising a mixture of an alkylated diphenyl and an alkyl phthalate ester as a plasticizer therefor.

3. A plastic composition of matter characterized by substantial lack of tackiness and possessing resistance to the action of light and heat and being flexible at low temperatures in film form consisting essentially of a polyvinyl acetal resin and comprising as a plasticizer therefor a mixture of from 35 to 40 parts of an alkylated diphenyl and from 20 to 25 parts of an alkyl phthalate ester to each 100 parts of the resin.

4. A composition as defined in claim 2 in which the alkylated diphenyl is an ethylated diphenyl obtained by direct ethylation of diphenyl with ethylene in the presence of a Friedel-Crafts catalyst.

5. A composition as defined in claim 2 in which the alkylated diphenyl is a propylated diphenyl fraction obtained by direct propylation of diphenyl with propylene in the presence of a Friedel-Crafts catalyst.

6. A composition as defined in claim 2 in which the alkyl phthalate ester is dibutyl phthalate.

7. A plastic composition of matter characterized by substantial lack of tackiness and possessing resistance to the action of light and heat and being flexible at low temperatures in film form, consisting essentially of a polyvinyl butylal resin and comprising as a plasticizer therefor a mixture of from 35 to 40 parts of an alkylated diphenyl, the alkyl groups of which have less than six carbon atoms and from 20 to 25 parts of dibutyl phthalate to each 100 parts of the resin.

8. A plastic composition of matter characterized by substantial lack of tackiness and possessing resistance to the action of light and heat and being flexible at low temperatures in film form, consisting essentially of a polyvinyl formal resin and comprising as a plasticizer therefor a mixture of from 35 to 40 parts of an alkylated diphenyl, the alkyl groups of which have less than six carbon atoms, and from 20 to 25 parts of diethyl phthalate to each 100 parts of the resin.

HOWARD K. NASON.